(12) United States Patent
Isago et al.

(10) Patent No.: US 10,251,220 B2
(45) Date of Patent: Apr. 2, 2019

(54) INDUCTION COOKING DEVICE

(71) Applicant: Panasonic Intellectual Property Management Co., Ltd., Osaka-shi, Osaka (JP)

(72) Inventors: Hiroshi Isago, Hyogo (JP); Tomoya Takahashi, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 120 days.

(21) Appl. No.: 15/592,539

(22) Filed: May 11, 2017

(65) Prior Publication Data

US 2018/0077760 A1 Mar. 15, 2018

(30) Foreign Application Priority Data

Sep. 15, 2016 (JP) .................... 2016-180819

(51) Int. Cl.
*H05B 6/12* (2006.01)
*A47J 36/00* (2006.01)
*A47J 27/00* (2006.01)

(52) U.S. Cl.
CPC .......... *H05B 6/1209* (2013.01); *A47J 27/004* (2013.01); *A47J 36/00* (2013.01)

(58) Field of Classification Search
CPC ....... H05B 6/1209; A47J 27/004; A47J 36/00; F24C 15/10

USPC ........................................................ 219/322
See application file for complete search history.

(56) References Cited

U.S. PATENT DOCUMENTS

| | | | |
|---|---|---|---|
| 7,274,008 B2 * | 9/2007 | Arnal Valero ....... | H05B 6/1263 219/452.11 |
| 9,883,553 B2 * | 1/2018 | Aranda Vazquez ...... | F24C 7/06 |
| 2010/0243640 A1 * | 9/2010 | Buck ...................... | F24C 7/082 219/622 |
| 2011/0088680 A1 * | 4/2011 | Suzuki ................. | F24C 15/102 126/1 R |
| 2015/0114953 A1 * | 4/2015 | Suzuki ................ | H05B 6/1209 219/620 |

FOREIGN PATENT DOCUMENTS

| | | | | |
|---|---|---|---|---|
| JP | S62-136091 U | | 8/1987 | |
| JP | 05159870 A | * | 6/1993 | ............... H05B 6/12 |
| JP | 2006-147303 A | | 6/2006 | |
| JP | 2008177010 | * | 7/2008 | ............... H05B 6/12 |
| JP | 2012052685 | * | 3/2012 | ............... H05B 6/12 |

* cited by examiner

*Primary Examiner* — Timothy L Maust
(74) *Attorney, Agent, or Firm* — Brinks Gilson & Lione

(57) ABSTRACT

An induction cooking device includes: a top plate on which an object to be heated is to be placed; a housing including a frame plate to which the top plate is adhered; a coil unit disposed inside the housing and pressed against the bottom surface of the top plate; and a locking mechanism that is attached to the bottom surface of the top plate and supports the top plate. The locking mechanism includes an engagement component including an engagement portion located a predetermined distance below the frame plate.

6 Claims, 5 Drawing Sheets

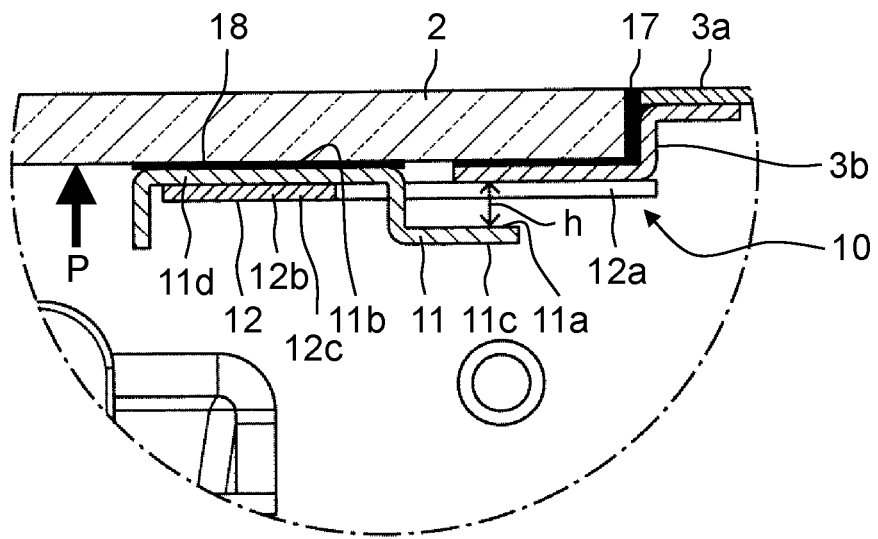
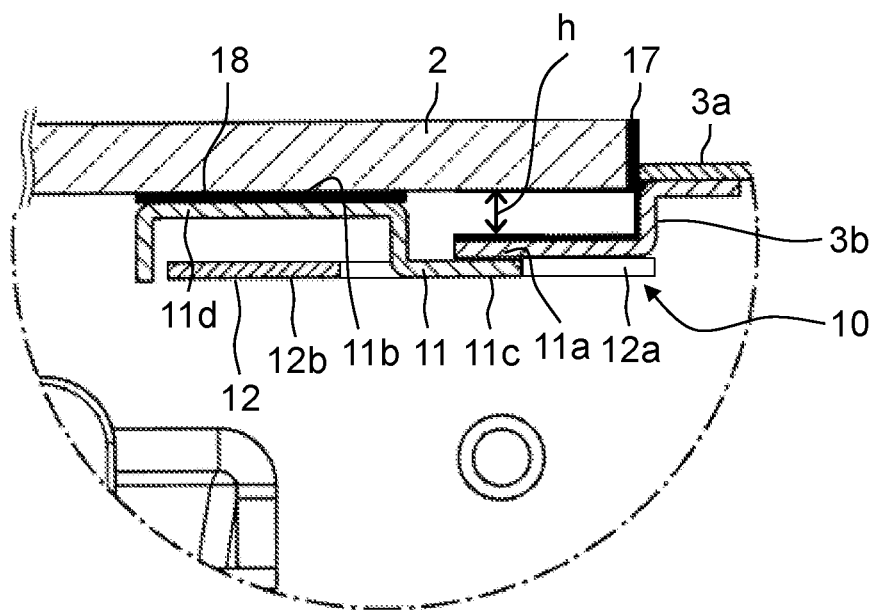

INDUCTION COOKING DEVICE

RELATED APPLICATIONS

This application claims priority under 35 U.S.C. § 119 to Japanese Patent Application No. 2016-180819 filed on Sep. 15, 2016, the entire contents of which is hereby incorporated by reference.

BACKGROUND OF THE INVENTION

1. Field of the Invention

The present disclosure relates to an induction cooking device for home or commercial use. In particular, the present disclosure relates to the structure in the induction cooking device for attaching a top plate on which an object to be heated is placed.

2. Description of the Related Art

Induction cooking devices are highly efficient in terms of converting input energy into heat. Moreover, it is easy to control the cooking temperature with induction cooking devices. Further, induction cooking devices produce little radiant heat, are safe, and are easy to clean. Accordingly, induction cooking devices have more advantages than other cooking devices. As such, induction cooking devices are used in many places, and come in a variety of types suitable for different places, such as built-in devices, stand-alone devices, and table-top devices. Examples of commercial induction cooking devices include counter-top devices that are placed on a kitchen counter, and recessed devices that are built into a kitchen counter. These induction cooking devices are large and designed to withstand use over a long span of time.

Typically, in induction cooking devices, the distance between the internal heating coil unit and the top plate is maintained by the heating coil being pressed against the bottom surface of the top plate with a spring. With induction cooking devices, when the distance between cookware (object to be heated) placed on the top plate, and the heating coil changes, the high-frequency voltage and high-frequency current generated in the inverter circuit that supplies high-frequency current to the heating coil changes, and as a result, the product cannot perform as designed. Moreover, the distance between the cookware and the heating coil is preferably as short as possible from the standpoint of heating efficiency. Therefore, minimizing the distance between the top plate on which the cookware is to be placed and the heating coil and maintaining that distance at all times is important for ensuring the performance of the induction cooking device.

Examples of top plates for placing the object to be heated used in induction cooking devices include glass plates and ceramic plates that are magnetically permeable and have a low rate of heat transfer. The top plate is fixed to the main body housing frame via an adhesive. A configuration in which caulk fills the gap between the top plate and the housing frame around the outer perimeter of the top plate has been proposed (for example, see Japanese Unexamined Utility Model (Registration) Application Publication No. S62-136091 and Japanese Unexamined Patent Application Publication No. 2006-147303).

SUMMARY OF THE INVENTION

The present disclosure provides a safe induction cooking device having a simple structure that does not expose, for example, the charging portion of the internal electrical circuit even in the event the adhesive that adheres the top plate to the housing deteriorates.

More specifically, an induction cooking device according to the present disclosure includes a top plate on which an object to be heated is to be placed; a housing defining a top opening that opens to a top surface side of the housing and including a frame plate, the top opening accommodating the top plate, the frame plate being adhered to the top plate and supporting a bottom surface of the top plate; a coil unit disposed inside the housing and pressed against the bottom surface of the top plate; and a locking mechanism that is attached to the bottom surface of the top plate and locks the top plate. The locking mechanism includes an engagement portion located a predetermined distance below the frame plate.

BRIEF DESCRIPTION OF THE DRAWINGS

These and other objects, advantages and features of the disclosure will become apparent from the following description thereof taken in conjunction with the accompanying drawings that illustrate a specific embodiment of the present disclosure.

FIG. 6A is an enlarged view of the structure in the circle indicated by the reference sign VI in FIG. 3;

FIG. 6B illustrates the structure in the circle indicated by the reference sign VI in FIG. 3 when the top plate and the housing are in a separated state.

Figure 1:
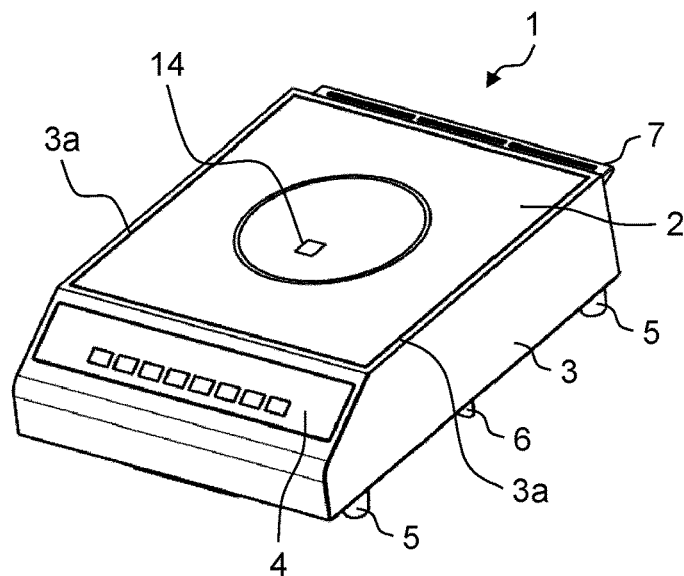
FIG. 1 is a perspective view illustrating the overall structure of an induction cooking device according to the embodiment of the present disclosure.

DETAILED DESCRIPTION OF THE PREFERRED EMBODIMENTS (Underlying Knowledge Forming Basis of the Present Disclosure)

The inventors gained the following knowledge as a result of diligent work to further improve the safety of induction cooking devices.

In an induction cooking device configured as described above, the top plate constantly receives the pressing force imparted by a spring. Therefore, due to this pressing force imparted by the spring, force is constantly applied to the adhesive that joins the top plate and the housing in a direction that could lead to the adhesive being torn off.

In an effort to counter this sort of tearing force, it is possible to provide, on the top surface side of the induction cooking device, a component that holds the top plate down from above. However, with induction cooking devices, it is desirable that the top surface of the top plate and the top surface side of the induction cooking device be flat so that cookware, which is the object to be heated, can be moved unhindered on the top plate. Accordingly, providing a component on the top surface side of the induction cooking device for holding down the top plate creates a protrusion, which is not preferable for induction cooking devices.

Moreover, with induction cooking devices, the top surface of the top plate often gets stained by food spilling from the cookware, which is the object to be heated placed on the top plate, or stained with a cleaning product when using the cleaning product to clean the top plate. As such, when the induction cooking device is used over a long span of time, the caulk around the outer perimeter of the top plate and the adhesive that fixes the top plate to the housing frame deteriorates. When the caulk around the top plate and the adhesive deteriorates after long-term usage, in the worst case scenario, the top plate may separate from the housing frame thereby exposing, for example, the charging portion of the internal electrical circuit that drives the heating coil unit.

Based on this new knowledge, the inventors arrived at the following disclosure.

An induction cooking device according to a first aspect of the present disclosure includes a top plate on which an object to be heated is to be placed; a housing defining a top opening that opens to a top surface side of the housing and including a frame plate, the top opening accommodating the top plate, the frame plate being adhered to the top plate and supporting a bottom surface of the top plate; a coil unit disposed inside the housing and pressed against the bottom surface of the top plate; and a locking mechanism that is attached to the bottom surface of the top plate and locks the top plate. The locking mechanism includes an engagement portion located a predetermined distance below the frame plate.

This configuration makes it possible to provide a safe induction cooking device capable of preventing the top plate from falling even in the event the adhesive that adheres the top plate to the housing deteriorates.

Moreover, an induction cooking device according to a second aspect of the present disclosure may include two of the locking mechanisms, and the two locking mechanisms may be positioned proximate diagonally opposing corners of the top plate in a plan view, in a vicinity of a lateral surface of the top plate.

This makes it possible to prevent the top plate from being substantially separated and lifted up from the housing.

Moreover, in an induction cooking device according to a third aspect of the present disclosure, the locking mechanism may further include: an engagement component including the engagement portion and an adhesion portion that is adhered to the bottom surface of the top plate; and a support component that supports the adhesion portion of the engagement component.

This makes it possible to easily assemble the locking mechanism.

Moreover, in an induction cooking device according to a fourth aspect of the present disclosure, the support component may include a positioning portion for positioning the engagement component relative to the top plate.

This makes it possible to easily and accurately assemble the locking mechanism.

Moreover, in an induction cooking device according to a fifth aspect of the present disclosure, the predetermined distance may be less than a thickness of the top plate.

With this configuration, since the top plate will not be lifted above the frame portion, for example, the internal charging portion will be not exposed. This makes it possible to further improve safety.

Moreover, in an induction cooking device according to a sixth aspect of the present disclosure, the support component may support the top plate via the engagement component.

This configuration makes it possible to securely attach the engagement component to the top plate.

Moreover, in an induction cooking device according to a seventh aspect of the present disclosure, the top opening may be covered by the top plate, and a top surface of the top plate and a top surface of the housing may be substantially flush.

This makes it possible for the user to easily move the object to be heated on the top plate.

The following describes an embodiment of the induction cooking device according to the present disclosure with reference to the drawings. Note that the induction cooking device according to the embodiment described below is exemplified as a commercial counter-top induction cooking device that sits on a kitchen counter top, but the configuration of the induction cooking device is not limited to the example given in the following embodiment, and includes other types of induction cooking devices having the technical characteristics according to the present disclosure. Note that in the description of the embodiment, the side of the induction cooking device to which the user is located when using the induction cooking device is the front side (front surface side), and the side of the induction cooking device opposite the front side is the rear side (rear surface side). Moreover, the right and left sides in the embodiment are from the perspective of front side of the induction cooking device.

Embodiment

Figure 2:
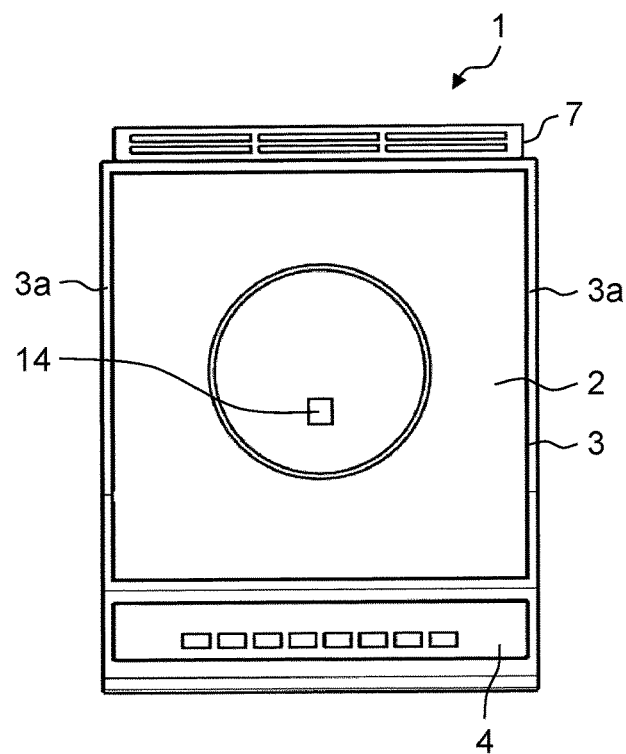
FIG. 2 is a plan view of the induction cooking device according to the embodiment.

FIG. 1 is a perspective view illustrating the overall structure of the induction cooking device according to the embodiment of the present disclosure. FIG. 2 is a plan view of the induction cooking device according to the embodiment.

As illustrated in FIG. 1 and FIG. 2, the induction cooking device according to this embodiment is induction cooking device 1, which is a commercial counter-top induction cooking device that sits on, for example, a kitchen counter.

The external appearance of induction cooking device 1 according to the embodiment is defined by a box-shaped housing 3 having a rearwardly inclined front surface and a top opening that opens to the top surface side, and quadrilateral top plate 2 provided so as to cover the top opening of housing 3. The top of housing 3 and top plate 2 have flat surfaces.

Top plate 2 is a glass or ceramic plate that is magnetically permeable, has a low rate of heat transfer, and is heat resistant. A circular pattern is illustrated on top plate 2 that indicates the heated region where, for example, the cookware, which is the object to be heated, is to be placed. Top plate 2 also has sensor window 14 for a temperature sensor (for example, an infrared sensor) for detecting the temperature of the object to be heated.

Control portion 4 for setting various settings for induction cooking device 1, such as setting the strength of the heat and setting time, is provided on the inclined front surface of induction cooking device 1.

An intake vent (not illustrated in the drawings) is provided in the bottom surface of housing 3 of induction cooking device 1. In order to secure an intake space on the bottom surface side of induction cooking device 1 when induction cooking device 1 is placed on, for example, a kitchen counter, a plurality of feet 5 are provided on the bottom surface of induction cooking device 1 (in this embodiment, one foot is provided at each of the four corners of the bottom surface). Moreover, exhaust vent 16 (see FIG. 4) is provided on the rear surface side of induction cooking device 1. In order to secure an exhaust space on the rear side of housing 3, a protruding rear surface spacer 7 is provided on the top portion of the rear surface of housing 3.

Note that in induction cooking device 1 according to this embodiment, in order to prevent exhaust from the rear surface side exhaust vent 16 from directly being drawn in through the bottom surface side intake vent, intake/exhaust divider plate 6 is provided on the bottom surface of induction cooking device 1 so as to separate the intake space for the intake vent from the exhaust space for exhaust vent 16 on the bottom surface side.

Figure 3:
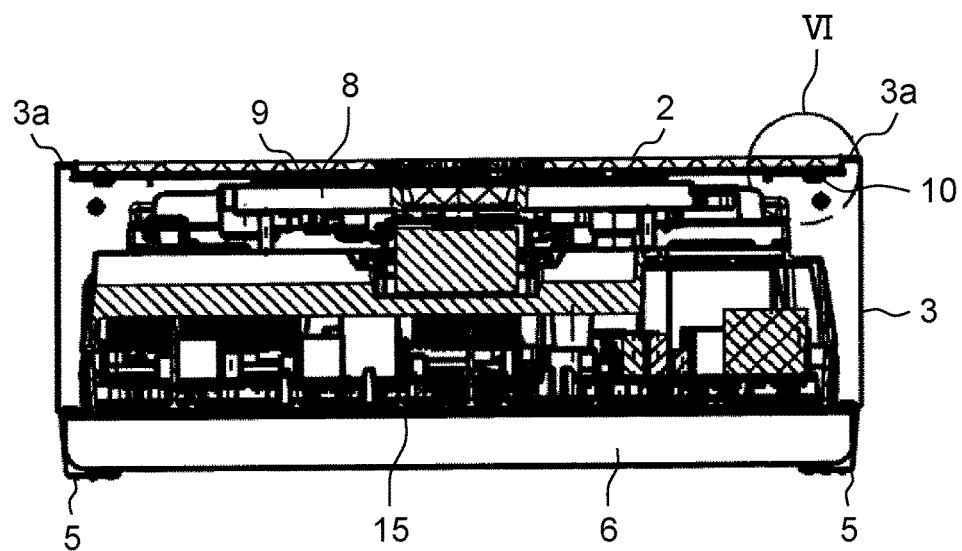
FIG. 3 is a cross section view of the inside of a housing of the induction cooking device according to the embodiment.

FIG. 3 is a cross section view of the inside of the housing of induction cooking device 1 according to the embodiment. Coil unit 8, circuit substrate 15, and a fan (not illustrated in the drawings) are disposed inside housing 3. Coil unit 8 includes heating coil 9. For example, a drive control circuit (including a power supply circuit) for driving heating coil 9 for induction heating is mounted on circuit substrate 15. The fan is for cooling, for example, coil unit 8 and circuit substrate 15.

Coil unit 8 includes for example, heating coil 9, a heat shield plate, an insulation plate, and ferrite stacked above a shield plate so as to be integrated as a single unit. Heating coil 9 heats the object to be heated via induction heating. The heat shield plate shields heat from the object to be heated, and is placed on the top surface side of heating coil 9. The insulation plate is disposed on the bottom surface side of heating coil 9 and provides electrical insulation. The ferrite is disposed on the bottom surface side of the insulation plate and has high magnetic permeability which yields a magnetic flux absorbing ability. Such an integrated coil unit 8 is supported by housing 3 via an elastic component such as a spring, contacts the bottom surface of top plate 2, and imparts a pressing force to top plate 2 from below.

Housing 3 includes frame portion 3a (see FIG. 6A) formed by bending the top end of housing 3 so as to extend horizontally inward relative to housing 3. Frame portion 3a defines the top opening that corresponds to the (quadrilateral) outline of top plate 2. With this, top plate 2 fits in the top opening. Top plate 2, which acts as the induction cooking device 1 placement surface for the object to be heated, is fixed in place via first adhesive 17 (see FIG. 6A) so as to cover the top opening of housing 3 with the lateral surfaces of top plate 2 in close proximity to frame portion 3a. The top surface of induction cooking device 1, which acts as the placement surface for the object to be heated, is a flat surface with no protrusions or recesses as a result of top plate 2 and frame portion 3a of housing 3 being essentially flush with each other.

Figure 4:
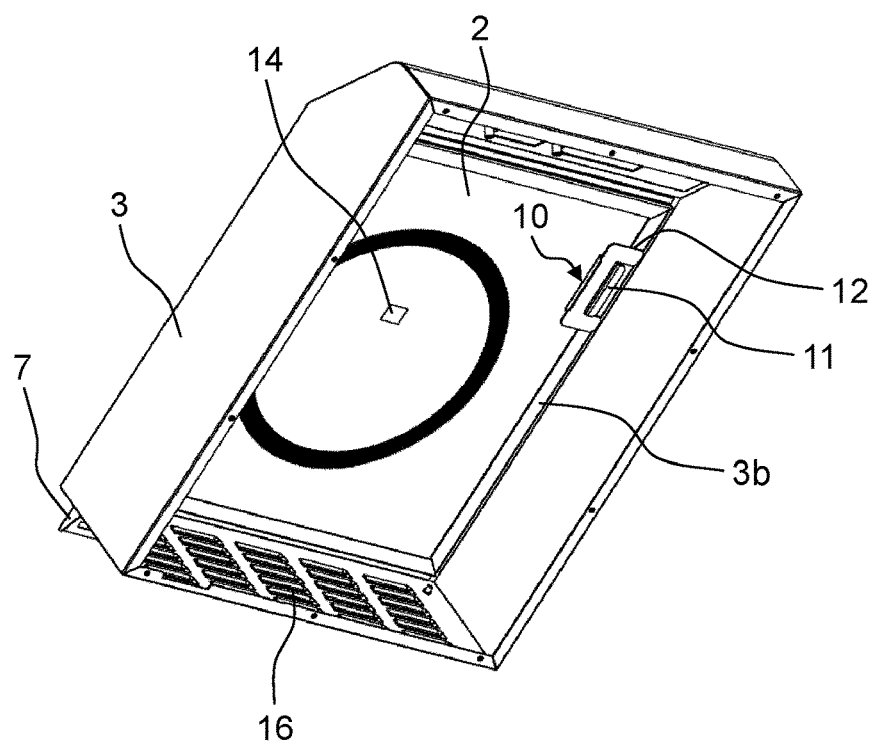
FIG. 4 is a perspective view, from the bottom surface side, of the housing and a top plate in the induction cooking device according to the embodiment.

FIG. 4 is a perspective view, from the bottom surface side, of housing 3 and top plate 2 in induction cooking device 1 according to the embodiment. As illustrated in FIG. 4, a plurality of exhaust vents 16 are formed on the rear surface side of housing 3 such that air flows out from exhaust vents 16 in a downward direction.

Figure 5:
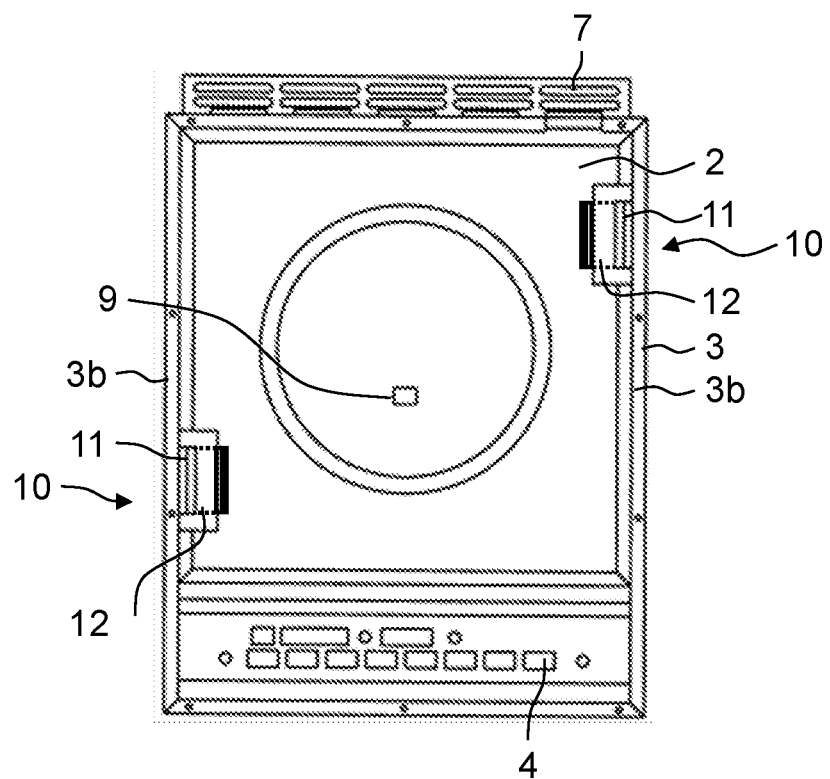
FIG. 5 is a bottom surface view, from below, of the housing and the top plate in the induction cooking device according to the embodiment.

FIG. 5 is a bottom surface view of housing 3 and top plate 2 from below.

As illustrated in FIG. 4 and FIG. 5, locking mechanism 10, which is a mechanism for preventing the top plate from falling, is provided on the bottom portion of top plate 2 of induction cooking device 1 according to the embodiment. Induction cooking device 1 according to this embodiment includes two locking mechanisms 10, one at the front-right side of top plate 2 and the other at the rear-left side of top plate 2, in the vicinity of the diagonally opposing corners of top plate 2.

Note that in this embodiment, as illustrated in FIG. 5, two locking mechanisms 10 are provided, one on each of the left and right sides of top plate 2, in the locations to the rear and front of diagonal corners of top plate 2, but the present disclosure is not limited to this example.

Note that when induction cooking device 1 includes two locking mechanisms 10, it is sufficient if the two locking mechanisms 10 are merely provided in positions that are essentially opposing positions on top plate 2, i.e., in positions proximate diagonally opposing corners of top plate 2 or on two opposing sides of top plate 2. This makes it possible to efficiently lock top plate 2.

FIG. 6A is an enlarged view of the structure in the circle indicated by the reference sign VI in FIG. 3, illustrating top plate 2 and locking mechanism 10 in a joined state.

As illustrated in FIG. 6A, frame plate 3b, which is a metal plate, is joined via, for example, welding, to frame portion 3a of housing 3, such that frame portion 3a and frame plate 3b are integral. Housing 3 includes frame portion 3a and frame plate 3b. Frame plate 3b is provided along the entire perimeter of the top opening defined by frame portion 3a. Frame plate 3b is bent so as to include a step and support top plate 2 from below.

First adhesive 17 fills the region in which frame plate 3b and the bottom surface of top plate 2 face each other, i.e., the space between top plate 2 and frame plate 3b. First adhesive 17 further fills the regions in which the lateral surfaces of top plate 2 and frame plate 3b face each other, around the enter perimeter of the lateral surfaces of top plate 2, as well as the regions in which the lateral surfaces of top plate 2 and frame portion 3a face each other. As such, top plate 2 is fixed to and integral with housing 3 as a result of being securely adhered to frame portion 3a and frame plate 3b. Note that the step in frame plate 3b is designed such that the top surface of top plate 2 and the top surface of frame portion 3a are flush in a state in which top plate 2 is integral with housing 3.

(Locking Mechanisms 10)

Induction cooking device 1 according to the embodiment includes locking mechanisms 10 as mechanism for preventing top plate 2 from falling in order to improve reliability and safety. Hereinafter, the configuration of locking mechanisms 10 will be described in detail.

As illustrated in the cross sectional view in FIG. 6A, engagement component 11, which is made of metal, is joined to the bottom surface of top plate 2 via second adhesive 18. Engagement component 11 has a bent cross-sectional shape. Engagement component 11 includes engagement surface 11a capable of engaging with frame plate 3b integrally formed with housing 3. As will be described later, engagement surface 11a engages with frame plate 3b in the case that top plate 2 separates from housing 3. The distance between engagement surface 11a and frame plate 3b is, in a normal state, predetermined distance (gap) h, as illustrated in FIG. 6A. Predetermined distance (gap) h is, for example, less than the thickness of top plate 2.

Moreover, locking mechanism 10 includes support component 12, which is made of metal and joined to frame plate 3b of housing 3 via, for example, welding. When top plate 2 is being assembled so as to cover the top opening of housing 3, support component 12 is used as a component for positioning, for adhering and fixing engagement component 11 to a predetermined location on the bottom surface of top plate 2.

As described above, engagement component 11 is a bent component. As illustrated in FIG. 6A, engagement component 11 includes: engagement portion 11c including engagement surface 11a capable of engaging with frame plate 3b; and adhesion portion 11d including adhesion surface 11b that adheres to the bottom surface of top plate 2 via second adhesive 18.

Moreover, support component 12 includes joining portion 12a that is joined to frame plate 3b of housing 3 via, for example, welding, and support portion 12b. Engagement component 11 is placed on support portion 12b when assembling top plate 2, and support portion 12b supports engagement component 11.

Figure 7:
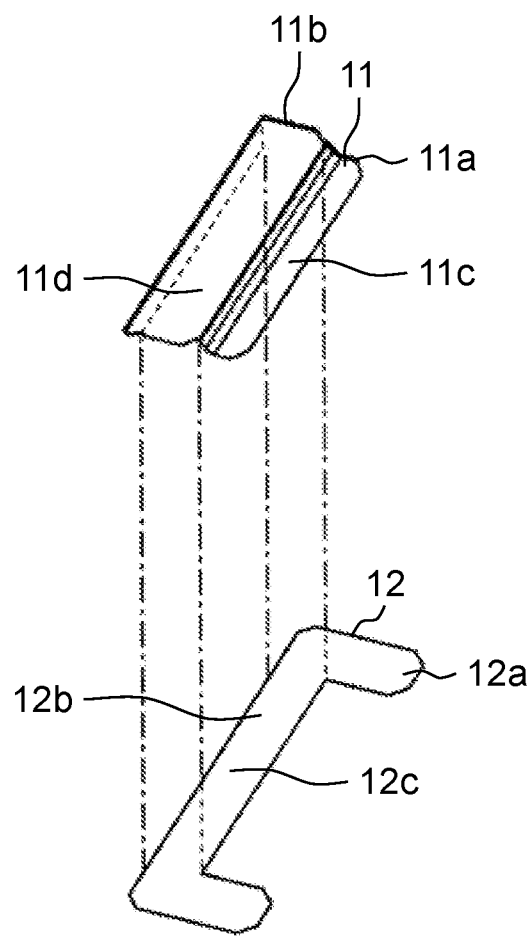
FIG. 7 is a perspective view of an engagement component and a support component of a locking mechanism in the induction cooking device according to the embodiment.

FIG. 7 is a perspective view of engagement component 11 and support component 12 of locking mechanism 10.

As illustrated in FIG. 7, support component 12 according to this embodiment is a squared U-shaped flat plate. Support component 12 includes joining portion 12a at both ends, and support portion 12b in the center.

Note that the shape of support component 12 is not limited to the example given in the embodiment; it is sufficient if support component 12 merely includes joining portion 12a joined to housing 3 and support portion 12b which supports engagement component 11.

Moreover, in the embodiment, frame portion 3a and frame plate 3b of housing 3 are joined and securely fixed via, for example, metal welds, and frame plate 3b and support component 12 are joined and securely fixed via, for example, metal welds.

Next, the assembly method used when attaching locking mechanism 10 configured as described above to induction cooking device 1 according to the embodiment will be described.

(1) In a state before top plate 2 is attached to housing 3, joining portion 12a of support component 12 is joined, via, for example, welding, to frame plate 3b joined to frame portion 3a of housing 3.

(2) Adhesion portion 11d of engagement component 11 is placed on support portion 12b of support component 12 joined to frame plate 3b, and second adhesive 18 is applied to adhesion portion 11d, on adhesion surface 11b that opposes the bottom surface of top plate 2. Moreover, first adhesive 17 is applied to the region in which frame plate 3b of housing 3 and top plate 2 oppose each other.

(3) Top plate 2 is placed so as to cover the top opening of housing 3 from above. At this time, top plate 2 is pressed down from above toward frame plate 3b of housing 3 on which first adhesive 17 is applied and toward adhesion portion 11d of engagement component 11 on which second adhesive 18 is applied. This adheres top plate 2 to frame plate 3b and adhesion portion 11d. First adhesive 17 that seeps from the gap between the outer perimeter of top plate 2 and frame portion 3a of housing 3 is removed so as to form a flat top surface on induction cooking device 1.

Induction cooking device 1 according to the embodiment includes two locking mechanisms 10, one formed on the left end portion of top plate 2 and the other formed the right end portion of top plate 2, in the vicinity of diagonally opposing corners of top plate 2. With the above-described assembly method, the two locking mechanisms 10 can be attached to housing 3 at the same time. In other words, even when a plurality of the locking mechanisms for the top plate according to the present disclosure are provided, they can be attached to housing 3 at the same time using the simple assembly method described above.

As described above, as a result of attaching locking mechanisms 10 to induction cooking device 1, engagement portion 11c of engagement component 11 is located predetermined distance (gap) h away from frame plate 3b of housing 3, as illustrated in FIG. 6A.

FIG. 6B illustrates the structure in the circle indicated by the reference sign VI in FIG. 3 when top plate 2 and housing 3 are in a separated state.

With induction cooking device 1 configured in this manner, when first adhesive 17 around top plate 2 deteriorates due to long-term usage and top plate 2 separates from housing 3, top plate 2 is pushed and lifted up from below via coil unit 8 due to pushing force P (see FIG. 6A) being imparted to coil unit 8 from below, whereby engagement portion 11c of engagement component 11 contacts the bottom surface of frame plate 3b, as illustrated in FIG. 6B. In this case, since the gap h between engagement surface 11a of engagement portion 11c and frame plate 3b is less than the thickness of top plate 2, top plate 2 is not lifted a substantial distance up. In other words, the bottom surface of top plate 2 is not lifted above the top surface of frame portion 3a.

In this way, since induction cooking device 1 according to the embodiment includes locking mechanism 10, even in the event that first adhesive 17 deteriorates and top plate 2 separates from housing 3, the charging portion, for example, of the electrical circuit in the housing would not be exposed. This improves the safety of induction cooking device 1 since it prevents a person from touching dangerous areas such as the charging portion.

In induction cooking device 1 according to the embodiment, engagement portion 11c of engagement component 11 in locking mechanism 10 is arranged inserted in an opening formed between the inner region of the squared U-shaped support component 12 and frame plate 3b of housing 3. As such, upon assembling locking mechanism 10, engagement component 11 can easily be positioned relative to top plate 2.

In other words, in the embodiment, as a result of the position of engagement component 11 being restricted in the left-right direction by positioning portion 12c (see FIG. 7) of support component 12, engagement component 11 is positioned relative to top plate 2.

Note that in the embodiment, induction cooking device 1 is exemplified as including two locking mechanisms 10, one on each of the left and right sides of top plate 2, in the locations to the rear and front of diagonal corners of top plate 2. This achieves a configuration that prevents top plate 2 from being lifted a substantial distance up. However, the present disclosure is not limited to this example; any configuration in which the locking mechanism of the top plate is disposed in an appropriate location that prevents the top plate from being lifted a substantial distance up is included in the present disclosure.

Moreover, in induction cooking device 1 according to the embodiment, frame portion 3a and frame plate 3b of housing 3 are exemplified as being separate components, but frame portion 3a and frame plate 3b may be a single component and locking mechanisms 10 may be attached to this single component.

In induction cooking device 1 according to the embodiment, first adhesive 17 is exemplified as being applied to frame portion 3a and frame plate 3b of housing 3, and second adhesive 18 is exemplified as being applied to adhesion portion 11d of engagement component 11, but the same type of adhesive may be used for first adhesive 17 and second adhesive 18. A heat-resistant adhesive, such as a silicon-based adhesive, is used as first adhesive 17 and second adhesive 18. Moreover, a heat-resistant caulk may be used on the top surface side of the gap between the outer perimeter of top plate 2 and housing 3.

As described above, merely by the addition of a simple structure, the present disclosure provides a safe and reliable induction cooking device that does not expose, for example, the charging portion of the electrical circuit inside the housing even in the event the adhesive that adheres the top plate to the housing deteriorates.

As described above, the induction cooking device according to the present disclosure is applicable to a variety of coking devices due to its safety and reliability, and therefore has a high market value.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

What is claimed is:

1. An induction cooking device, comprising:
   a top plate on which an object to be heated is to be placed;
   a housing defining a top opening that opens to a top surface side of the housing and including a frame plate, the top opening accommodating the top plate, the frame plate being adhered to the top plate and supporting a bottom surface of the top plate;
   a coil unit disposed inside the housing and pressed against the bottom surface of the top plate;
   an engagement plate which is supported by a support plate, wherein the engagement plate having a first portion adhered to the bottom surface of the top plate, and a second portion of the engagement plate is shaped to maintain a predetermined distance spaced below the frame plate, such that both the engagement plate and the top plates are allowed to move upward together above the support plate, and the upward movement is limited to travel no more than the predetermined distance thus forming an upward movement locking mechanism for the top plate.

2. The induction cooking device according to claim 1, wherein the locking mechanism comprises two locking mechanisms, and the two locking mechanisms are positioned proximate diagonally opposing corners of the top plate in a plan view, in a vicinity of a lateral surface of the top plate.

3. The induction cooking device according to claim 1, wherein the support plate includes a positioning portion for positioning the engagement component relative to the top plate.

4. The induction cooking device according to claim 1, wherein the predetermined distance is less than a thickness of the top plate.

5. The induction cooking device according to claim 1, wherein the support plate supports the top plate via the engagement component.

6. The induction cooking device according to claim 1, wherein the top opening is covered by the top plate, and a top surface of the top plate and a top surface of the housing are substantially flush.

\* \* \* \* \*